United States Patent
Araujo

(10) Patent No.: US 8,925,958 B2
(45) Date of Patent: Jan. 6, 2015

(54) CENTRAL HANGER BRACKETS AND EQUALIZERS FOR TANDEM SUSPENSION

(71) Applicant: Suspensys Sistemas Automotivos Ltda., Caxias do Sul, Estado do Rio Grande (BR)

(72) Inventor: Joao Felipe de Souza Araujo, Caxias do Sul (BR)

(73) Assignee: Suspensys Sistemas Automotivos Ltda. (BR)

( * ) Notice: Subject to any disclaimer, the term of this patent is extended or adjusted under 35 U.S.C. 154(b) by 0 days.

(21) Appl. No.: 14/104,919

(22) Filed: Dec. 12, 2013

(65) Prior Publication Data

US 2014/0159349 A1 Jun. 12, 2014

(30) Foreign Application Priority Data

Dec. 12, 2012 (BR) .......................... 102012031693 5

(51) Int. Cl.
*B60G 5/00* (2006.01)
*B60G 11/10* (2006.01)

(52) U.S. Cl.
CPC ..................................... *B60G 11/10* (2013.01)
USPC ............. 280/676; 280/124.163; 280/124.164; 280/124.165; 280/124.175

(58) Field of Classification Search
USPC ............ 280/676, 124.163, 124.164, 124.165, 280/124.175
See application file for complete search history.

(56) References Cited

U.S. PATENT DOCUMENTS

| | | | | |
|---|---|---|---|---|
| 3,586,308 A * | 6/1971 | King | ................................ | 267/52 |
| 3,591,197 A * | 7/1971 | Haley | ............................. | 280/682 |
| 3,645,555 A * | 2/1972 | Traylor | ......................... | 280/682 |
| 3,799,562 A * | 3/1974 | Hinchliff | ....................... | 280/682 |
| 3,841,652 A * | 10/1974 | Higginson | .................... | 280/682 |
| 3,929,347 A * | 12/1975 | Masser | ......................... | 280/676 |
| 4,033,606 A * | 7/1977 | Ward et al. | .................... | 280/682 |
| 4,371,189 A * | 2/1983 | Raidel | ........................... | 280/682 |
| 4,383,703 A * | 5/1983 | Honda et al. | .................. | 280/682 |
| 4,420,171 A * | 12/1983 | Raidel | ........................... | 280/682 |
| 4,486,029 A * | 12/1984 | Raidel | ........................... | 280/682 |
| 5,209,518 A * | 5/1993 | Heckenliable et al. | ........ | 280/680 |
| 5,615,906 A * | 4/1997 | Raidel, Sr. | .................... | 280/686 |

* cited by examiner

*Primary Examiner* — Toan To

(74) *Attorney, Agent, or Firm* — Amster, Rothstein & Ebenstein LLP

(57) ABSTRACT

This invention relates to central hanger brackets and equalizers for tandem suspension, used in trucks, trailers and semi-trailers, provided with spring pack arranged on the axles of the vehicle comprising an equalizer, provided with an intermediate area located in the upper part of the body, said area coupling to a surface arranged in the central hanger bracket. The set promotes a structural arrangement that allows the articulation of said equalizer, and eliminates the use of fixing pins, bushings or screws to attach said set to said central hanger bracket, in order to simplify the system and reduce the number of components, providing better conditions for the durability and maintenance of the suspension and thus reducing the operating cost and the cost of the product itself.

8 Claims, 20 Drawing Sheets

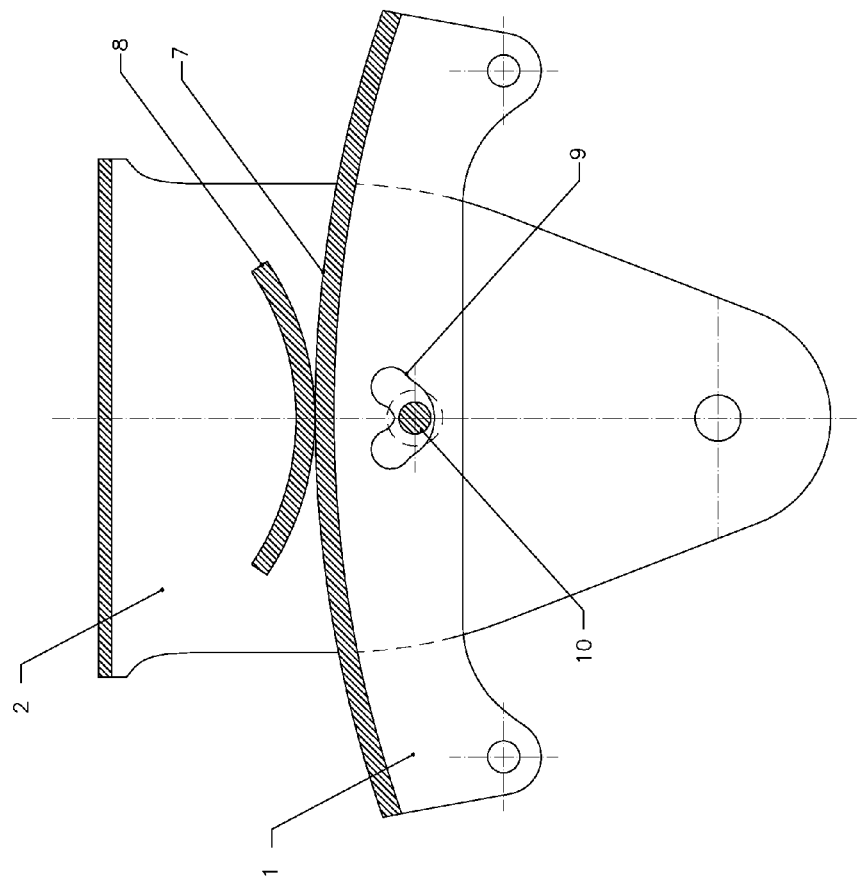
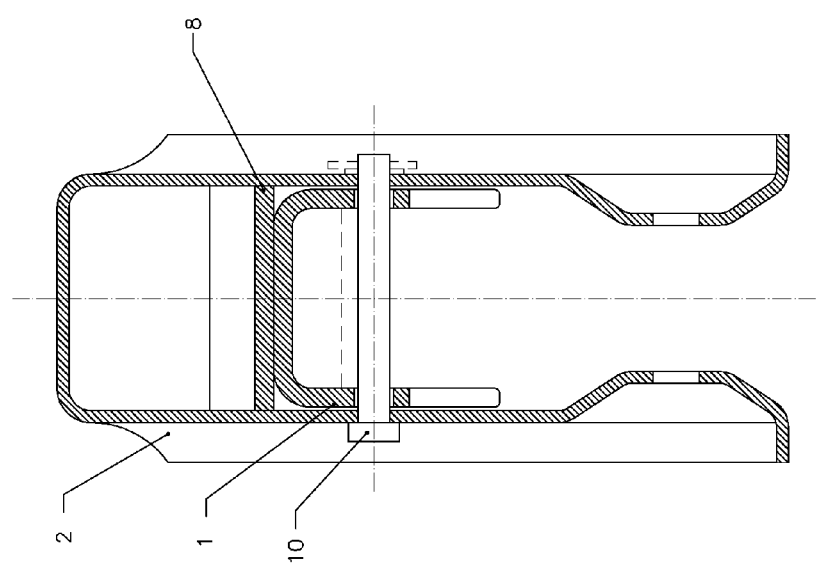

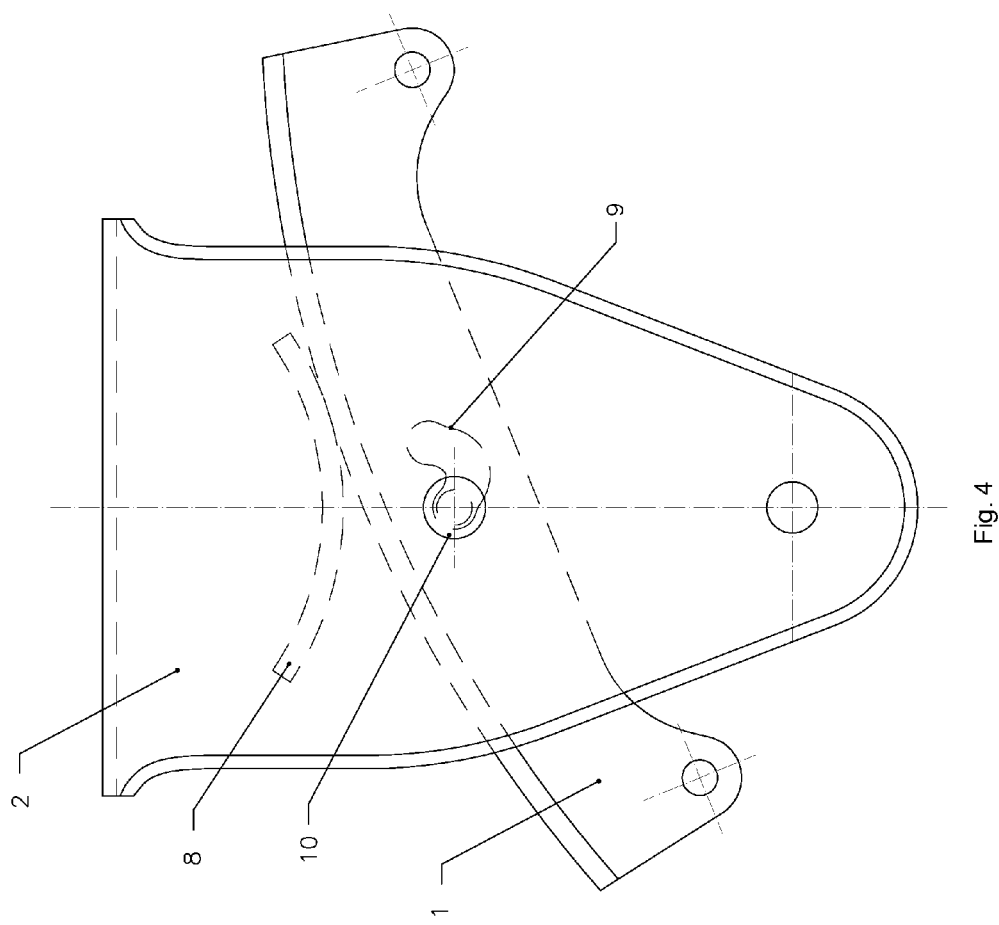

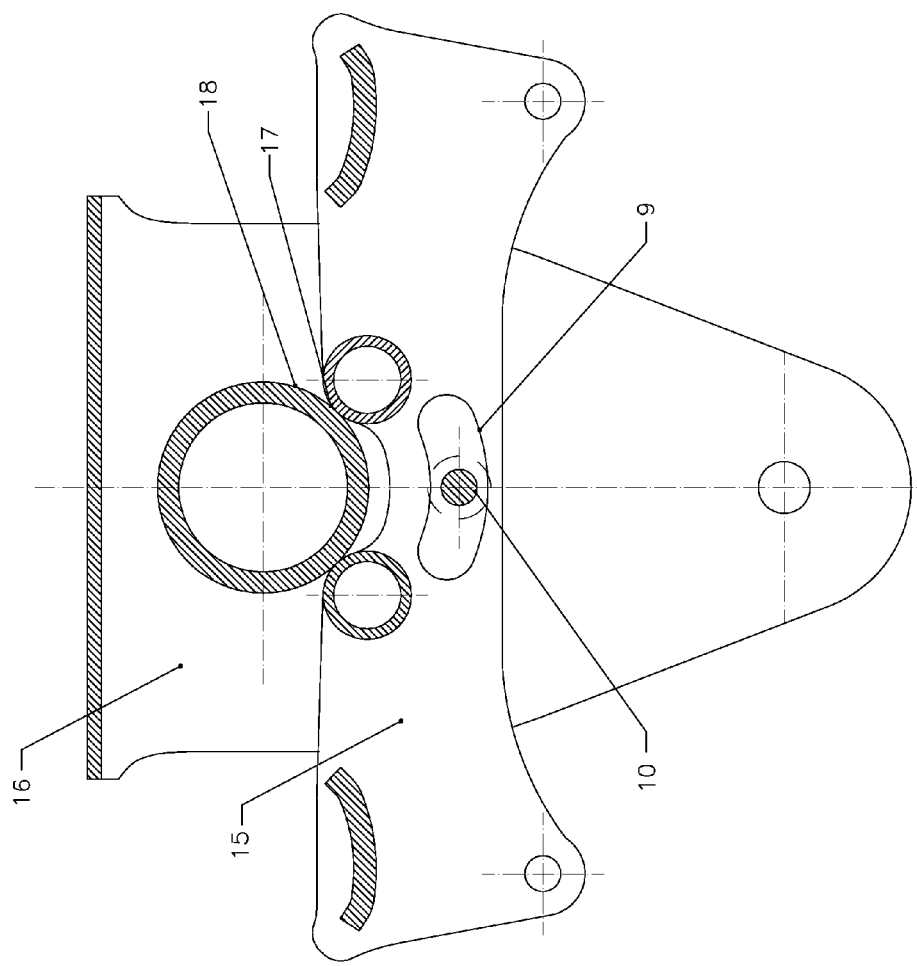
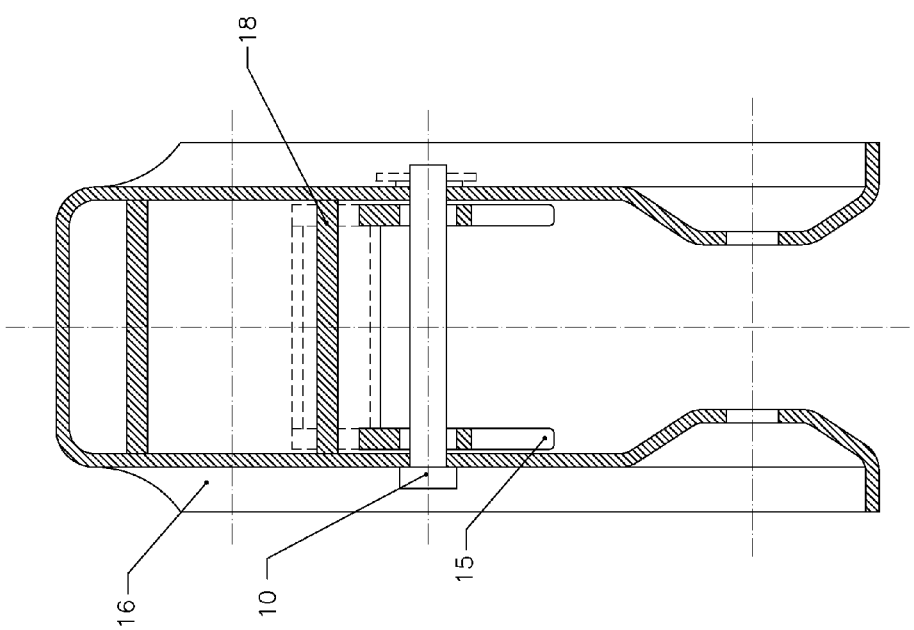

CENTRAL HANGER BRACKETS AND EQUALIZERS FOR TANDEM SUSPENSION

The present invention relates to a central hanger brackets and equalizers for tandem suspension, used in trucks, trailers and semi-trailers, which relates particularly to a new interface arrangement and constructive form, for the vertical movement of the equalizer on the central hanger bracket, providing means for articulation by means of the seat which is outward to the equalizer body, the oscillation of said equalizer occurring around a seat located in the body of the central hanger bracket as a result of the movement of the vehicle axles on the road.

The new central hanger brackets and equalizers for tandem suspension are designed to replace the traditional equalizers and hanger brackets using cylindrical rotating bearings arranged in the body of the equalizer, as well as other constructive forms in use, in order to simplify the system and reduce the number of components, providing better conditions for the durability and maintenance of the suspension and thus reducing the operating cost and the cost of the product itself.

The preferred embodiment of this invention achieves its purposes by means of a geometric arrangement on the central hanger bracket, forming an area with the surface in flat or convex cavity, the surface leaning on another area on the equalizer with flat or also convex surface, as well as other constructive forms shown in the drawings.

BACKGROUND OF THE INVENTION

Among the various embodiment in the art of tandem axle suspensions used in trucks, trailers and semi-trailers, it stands out the suspensions using a spring pack mounted on each axle and longitudinally interconnected by means of load equalizers housed on the chassis hangers of the vehicle, which are commercially referred to as mechanical suspension.

The constructive forms of these suspensions using equalizers, spring pack and chassis hangers come in several models using equalizer bearings built in different shapes, usually cylindrical, provided with pins, bushings, bearings and corresponding attachments.

The most used equalizer pivots comprise pins and metal bushings and are provided with lubrication means.

Said lubrication-dependent equalizer pivots are subject to considerable wear caused by friction between the parts that rotate on an oscillating semi-revolving form, at an angle close to 20° and on the area where the load is concentrated. Because of this, lubrication becomes poor due to the high pressure between the parts, the constant presence of contaminants and abrasive materials from dirt roads, and the precarious sealing conditions of the bearing, which results from a gradual process of wear.

There exist also cases of equalizer pivots using self-lubricating bushings, wherein more appropriate sealing becomes necessary, making it complex and costly.

The systems using journal bearings with bearings and where sealing is better also need lubrication, depending on the type of bearing used. In this case, wear on the bearing race also takes place on the area where load is concentrated due to the small rotating angle of the equalizer.

There are other systems of equalizer pivots that do not use lubrication since they are provided with rubber bushings or elastomeric cushions, allowing elastic deformation so that the equalizer may articulate relative to the bracket.

In this case, more space is needed for the bearing due to the low resilience of the material, and this is a drawback. Due to elasticity, they allow lateral movement of the equalizer relative to the bracket, requiring the use of mechanical stops to retain this movement, which ultimately increase their cost.

In addition, these brackets and equalizers must also have fixing pins or screws that ultimately make assembly more difficult. In case said brackets are welded to the chassis of the vehicle, the equalizer must be mounted to the bracket following the welding and painting processes, which, likewise, results in ergonomically undesired tasks that make assembly time longer.

The systems described above can be viewed in the art of the illustrative drawings, in FIGS. 9, 9a, 9b, 10, 10a and 10b.

The document BRMU8601825-2 describes a constructive arrangement applied to the equalizer of mechanical tandem suspensions, used in commercial vehicles, equipped with stamped sides, support shoes, said support shoes projecting beyond the sides, said sides being joined by welding, polymeric sliding pads mounted on the sides, metal tube, wherein the elastic bushing is mounted, said elastic bushing being either a separate part or a piece attached to the equalizer, the elastic element being vulcanized to the metal or non-metal covers of the bearing and/or directly to the metal pipe.

The document described above presents as advantages the significant increase in the durability of the balance and in its pivoting system, increased reliability, and acts as a filter for the high vibration caused to the equalizer, said equalizer being, furthermore, provided with polymeric pads for lateral sliding with the bracket.

The drawback in relation to this system, although with advantages over the previous technique, is the high cost thereof, the complexity of its assembly, in addition to the difficulty in obtaining a proper torque on the axial attachment of the elastic bushing with the bracket.

The document BRPI0802402-2 describes an equalizer with a non-cylindrical bearing for a tandem axle suspension, said tandem axle suspension being basically provided with a metal frame, said metal frame comprising an equalizer, said equalizer being provided with a non-cylindrical oscillating bearing in the middle area, said bearing being surrounded by an elastomeric bushing or of any other material with equivalent characteristics, said bushing being provided with an internal bushing element, which can be in a more rigid extension of the same material or by any other material, both with non-cylindrical geometric shapes, for the attachment of the equalizer to the frame of the vehicle or to the hanger brackets of the suspension, by means of screws or any other means of attachment, being also provided, at the ends of said equalizer, seats for the tips of the springs, said spring seats being defined by a succession of matching radii.

The document described above brings, as advantages, optimization in the shape of the bushing relative to the load applied and to the inner space of the equalizer, improvement in comfort and in the transmission of noise to the vehicle, in addition to not requiring lubrication.

The drawback in this system, although offering advantages over the system described in the previous document, is still the high cost of the bushing provided with elastomeric, due to its complexity, impacting on the cost of replacement and also on the need of stops to retain the lateral displacement relative to the bracket, as earlier explained.

Among the problems found in the hanger brackets and equalizers of the art of tandem suspensions, we highlight, as the most relevant ones, the disadvantage of having too many and different components that are complex and subject to premature wear, requiring periodic maintenance, in addition to the need to use precise torque bands on the mounting brackets, these mounting brackets being difficult to control, not to mention that they may cause components to fail in use.

Said brackets and equalizers, due to the diversity and complexity of their components and processes, are more subject to failures in their manufacturing and assembly during the various steps of their production process, these production processes ranging from the purchase of components to the installation in the vehicle, having the potential of worsening the problems mentioned above.

Another drawback in the current hanger brackets and equalizers is that they are provided with various types of materials and require many steps in their manufacturing process, which ultimately increases their cost.

Another deficiency found in the cited art of equalizers is structural discontinuity due to the presence of bushing or bearing housed inside the body, the body being usually welded, or even cast, wherein there is the need to provide, around said cast body, structural elements to remedy this discontinuity, which makes the equalizer heavier and costly.

Another drawback is the need of conducting maintenance procedures more frequently due to the fact that their components are more subject to wear, resulting in a high maintenance cost.

It is, therefore, a need in this art to provide new central hanger brackets and equalizers for tandem suspensions, these central hanger brackets and equalizers being simple in their construction process, easy to mount and resilient to wear, with a fewer number and type of components, which ultimately results in better performance and lower cost of the product.

These new central hanger brackets and equalizers in a tandem suspension will also contribute to facilitate the processes of production, storage, transport logistics, and mounting of the suspension on the vehicle, due to their simplicity and fewer number and type of components.

SUMMARY OF THE INVENTION

The maim object of present invention is to provide new central hanger brackets and equalizers in tandem suspensions for trucks, trailers and semi-trailers, with new structural constructive arrangements between both, the central hanger brackets and the equalizer, providing and improving their functionality relative to existing systems, with simplicity, ease of assembly, resistance to wear, and fewer number and type of components.

Another object is to facilitate the production, storage, transport logistics and mounting on the vehicle, with fewer components, and, as a result, with lower cost of the end product.

Also another object is to minimize maintenance interventions on the vehicle, reducing the number and time of such maintenance interventions.

BRIEF DESCRIPTION OF THE DRAWINGS

FIG. 2—is a vertical section view perpendicular to the chassis in the area of the central hanger bracket and equalizer shown in FIG. 1;

FIG. 3—is a view of vertical section parallel to the chassis in the area of the central hanger bracket and equalizer shown in FIG. 1;

FIG. 4—is a side view of the hanger bracket and equalizer shown in FIG. 1, illustrating the equalizer inclined at a jounce position;

FIG. 29—is a view of vertical section perpendicular to the chassis in the area of the central hanger bracket and equalizer of FIG. 18, illustrating another embodiment of the hanger bracket and equalizer of this invention;

FIG. 30—is a view of vertical section parallel to the chassis in the area of the hanger bracket and equalizer of FIG. 18, illustrating the same embodiment of the central hanger bracket and equalizer shown in FIG. 29.

DETAILED DESCRIPTION OF THE INVENTION

Figure 1:
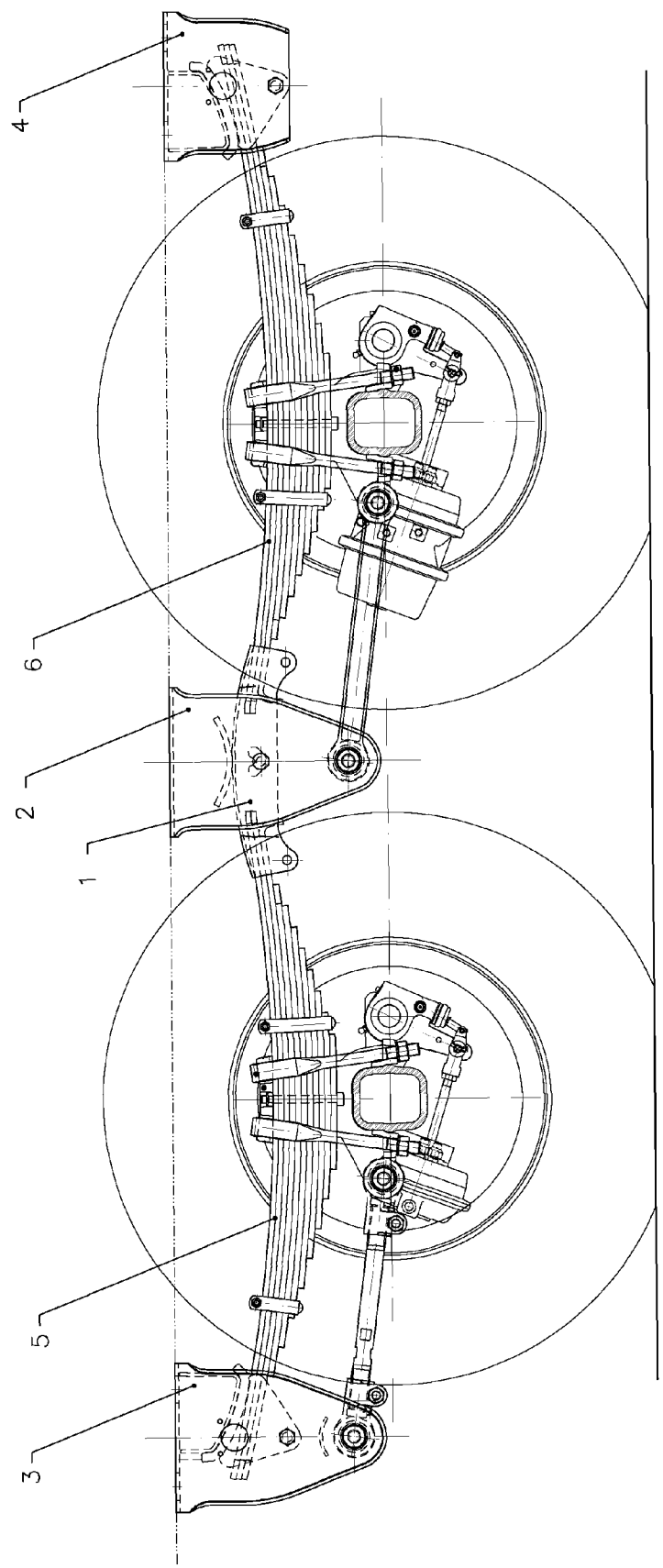
FIG. 1—is a side view of a suspension illustrating the preferred embodiment of the central hanger bracket and equalizer for tandem suspension, which is also the subject-matter of this invention.
Figure 6:
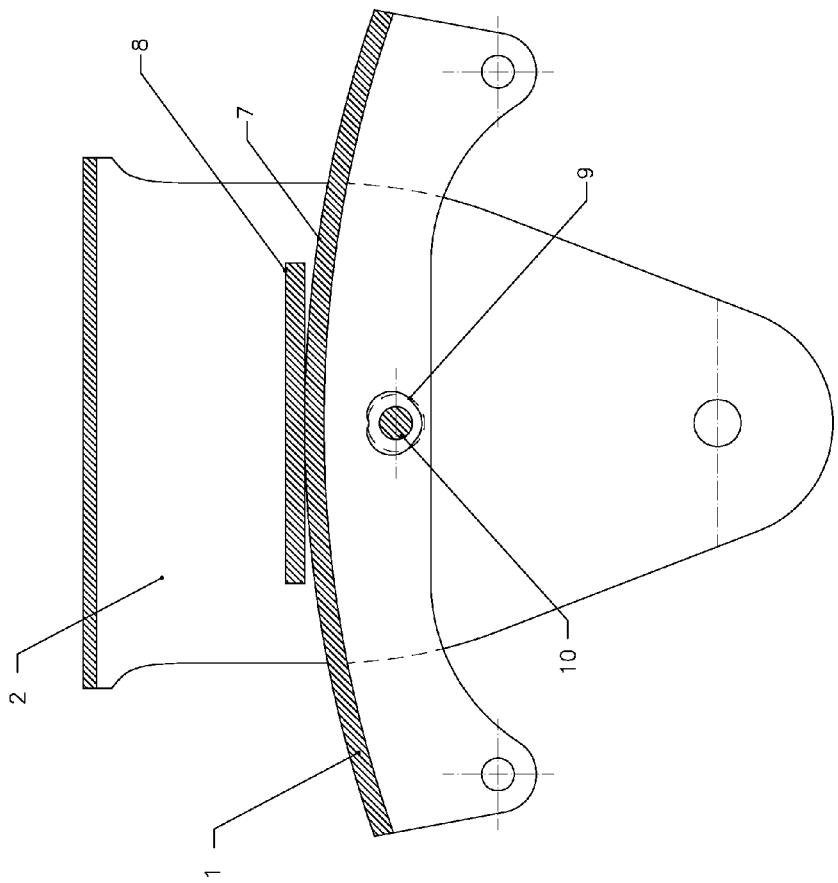
FIG. 6—is a view of vertical section parallel to the chassis in the area of the central hanger bracket and equalizer shown in FIG. 1, illustrating the same embodiment presented in FIG. 5.
Figure 5:
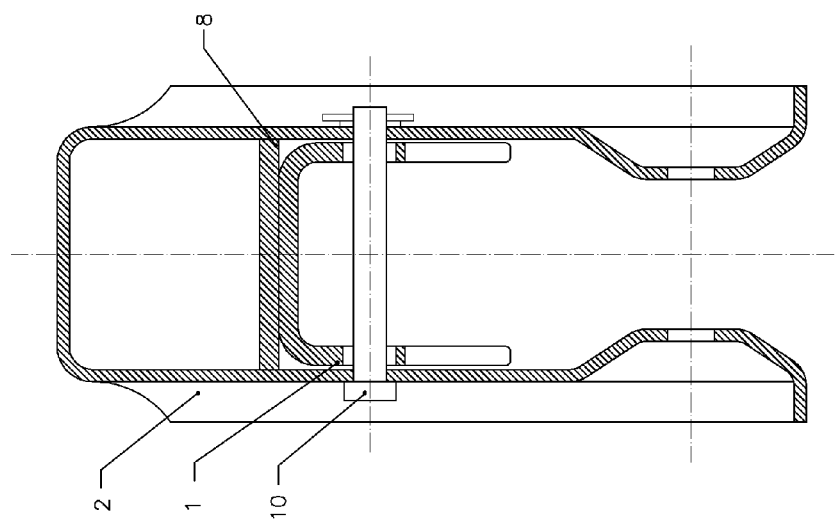
FIG. 5—is a view of vertical section perpendicular to the chassis in the area of the central hanger bracket and equalizer shown in FIG. 1, illustrating one embodiment of this invention.
Figure 8:
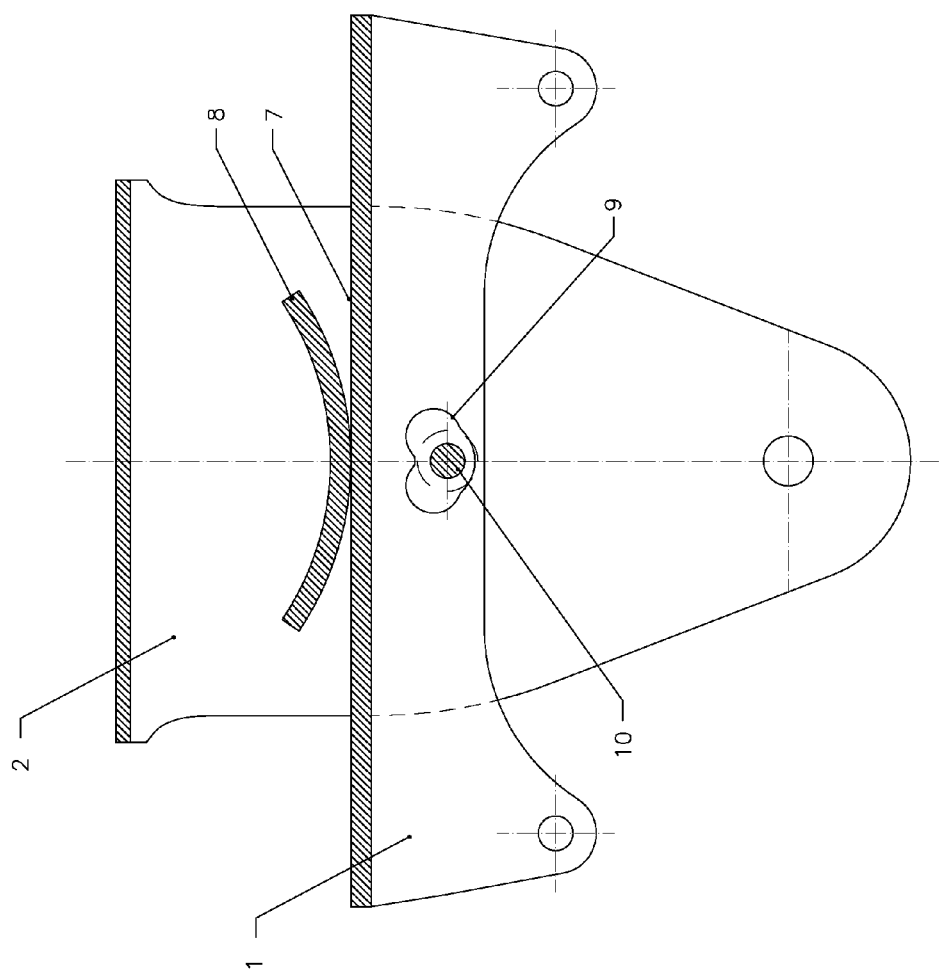
FIG. 8—is a view of vertical section parallel to the chassis in the area of the central hanger bracket and equalizer shown in FIG. 1, illustrating the same embodiment presented in FIG. 7.
Figure 7:
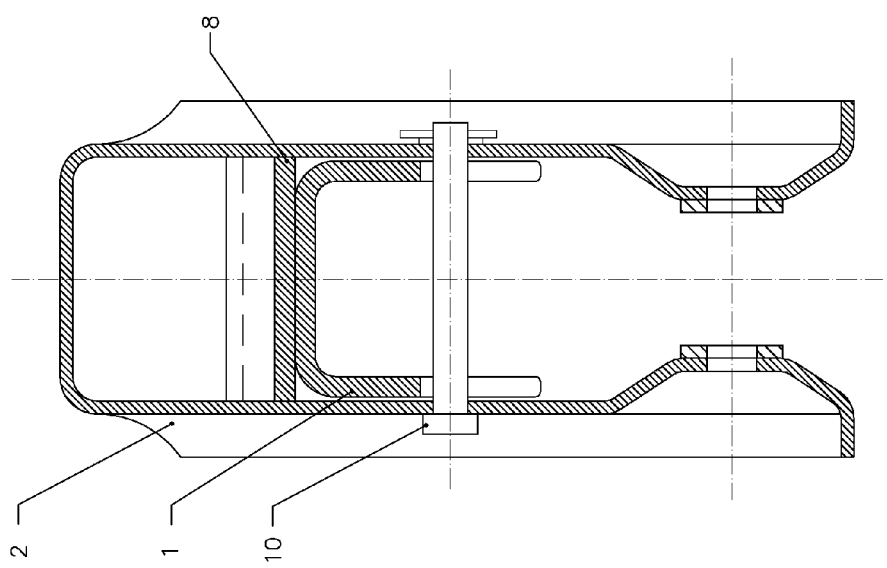
FIG. 7—is a view of vertical section perpendicular to the chassis in the area of the central hanger bracket and equalizer shown in FIG. 1, illustrating another embodiment of the present invention.
Figure 9:
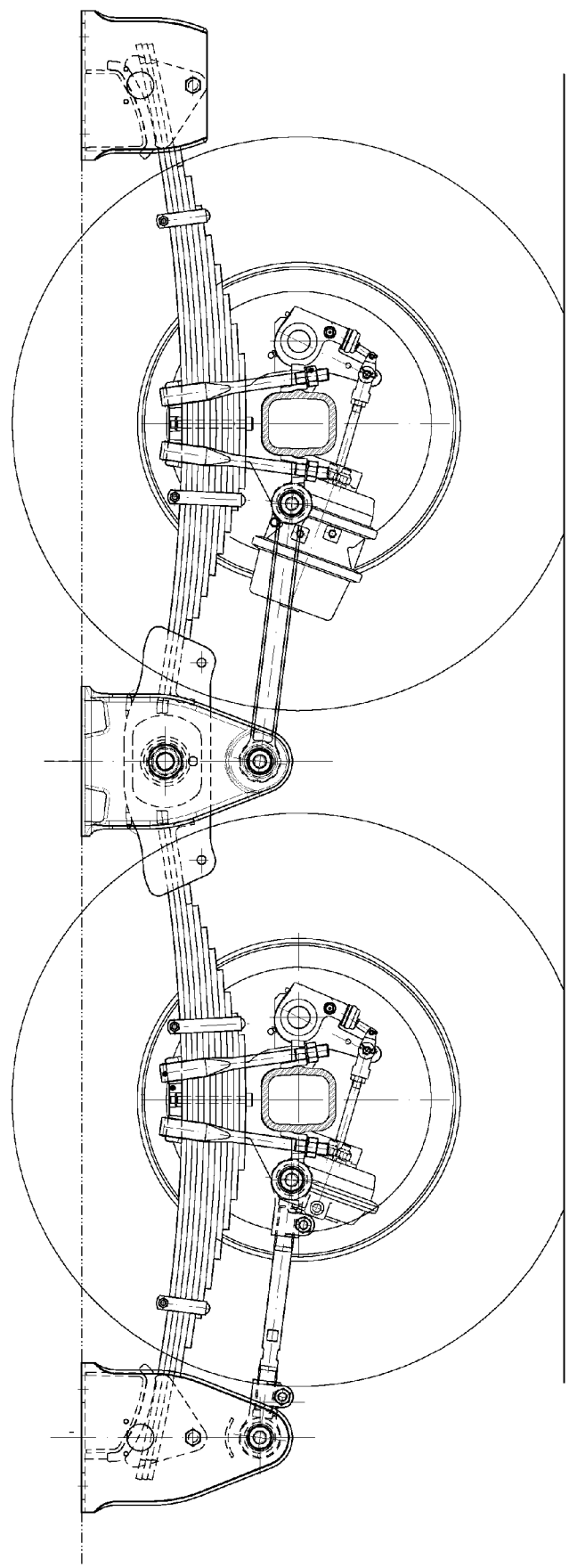
FIG. 9—is a side view of a tandem suspension with central hanger bracket and equalizer, the equalizer having the art of a cylindrical bearing and elastomeric bushing.
Figure 9B:
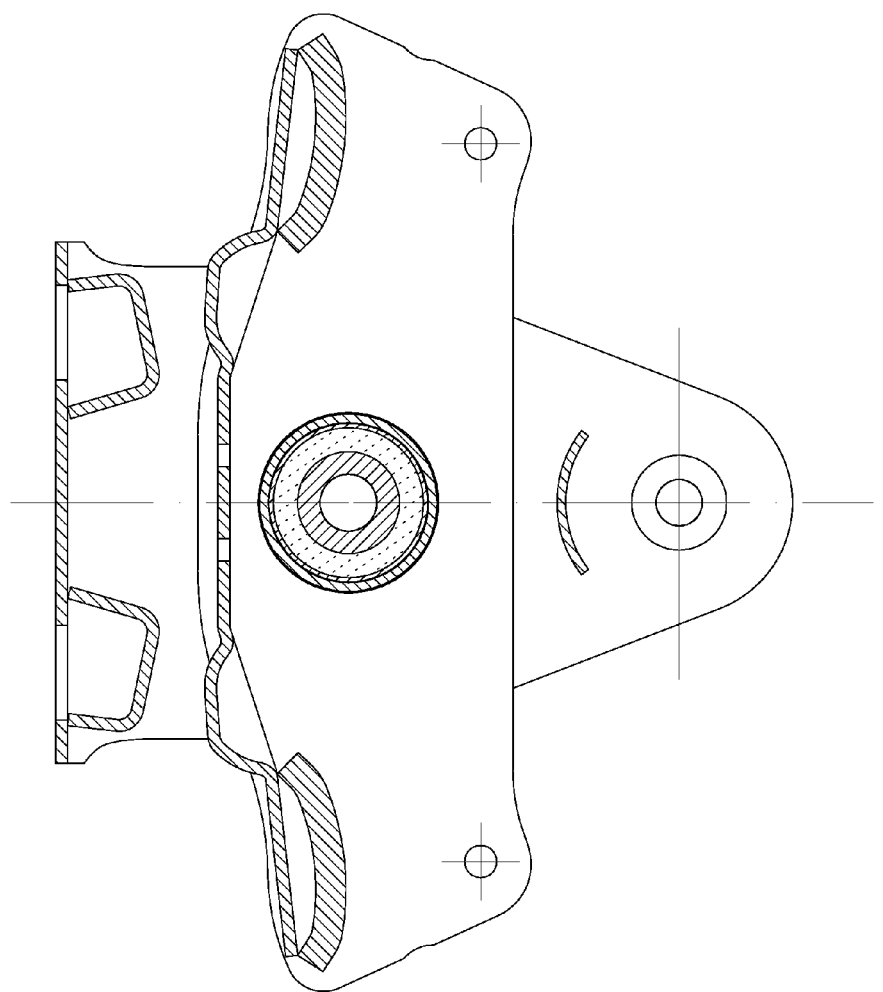
FIG. 9b—is a view of vertical section parallel to the chassis in the area of the central hanger bracket and equalizer of the art of FIG. 6.
Figure 9A:
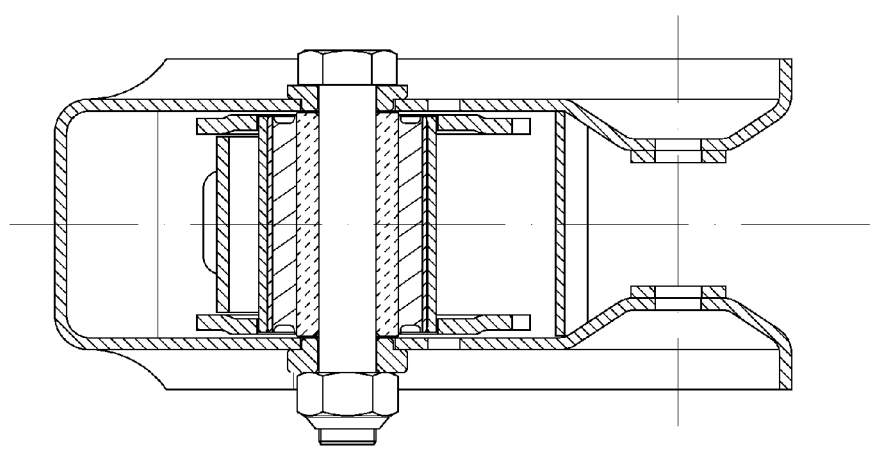
FIG. 9a—is a view of vertical section perpendicular to the chassis in the area of the central hanger bracket and equalizer shown in the art of FIG. 6.
Figure 10:
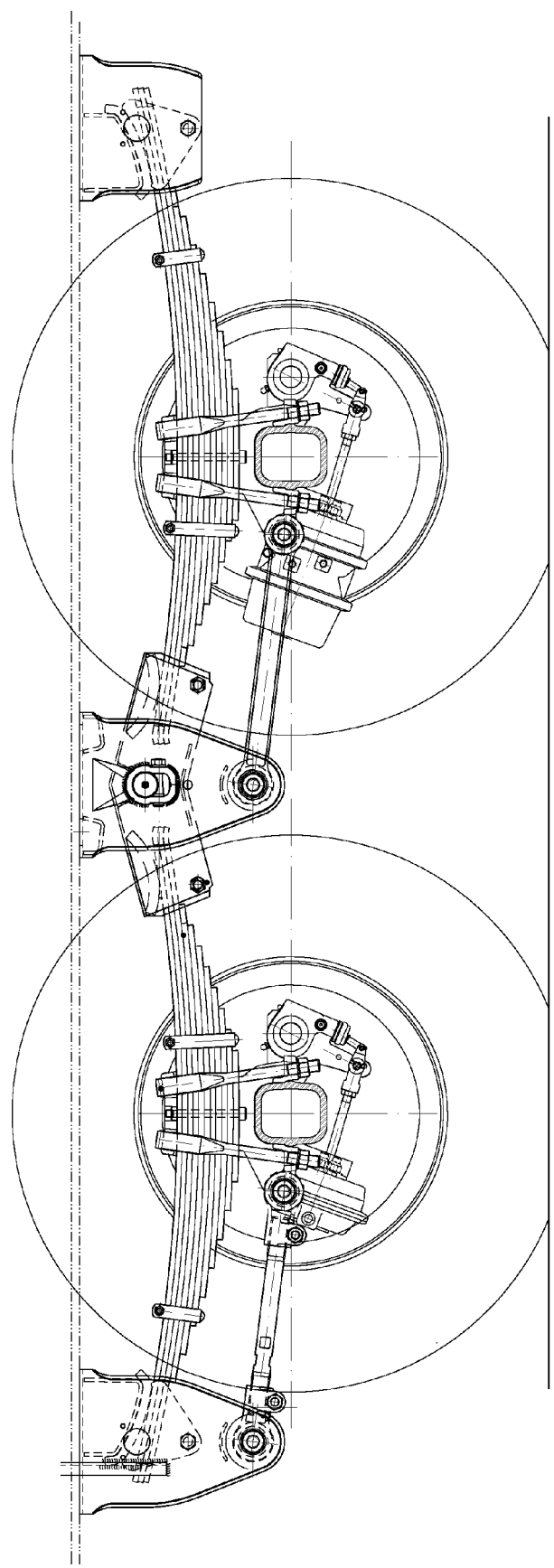
FIG. 10—is a side view of a tandem suspension with central hanger bracket and equalizer, the equalizer having the art of a cylindrical bearing and a metal bushing.
Figure 10B:
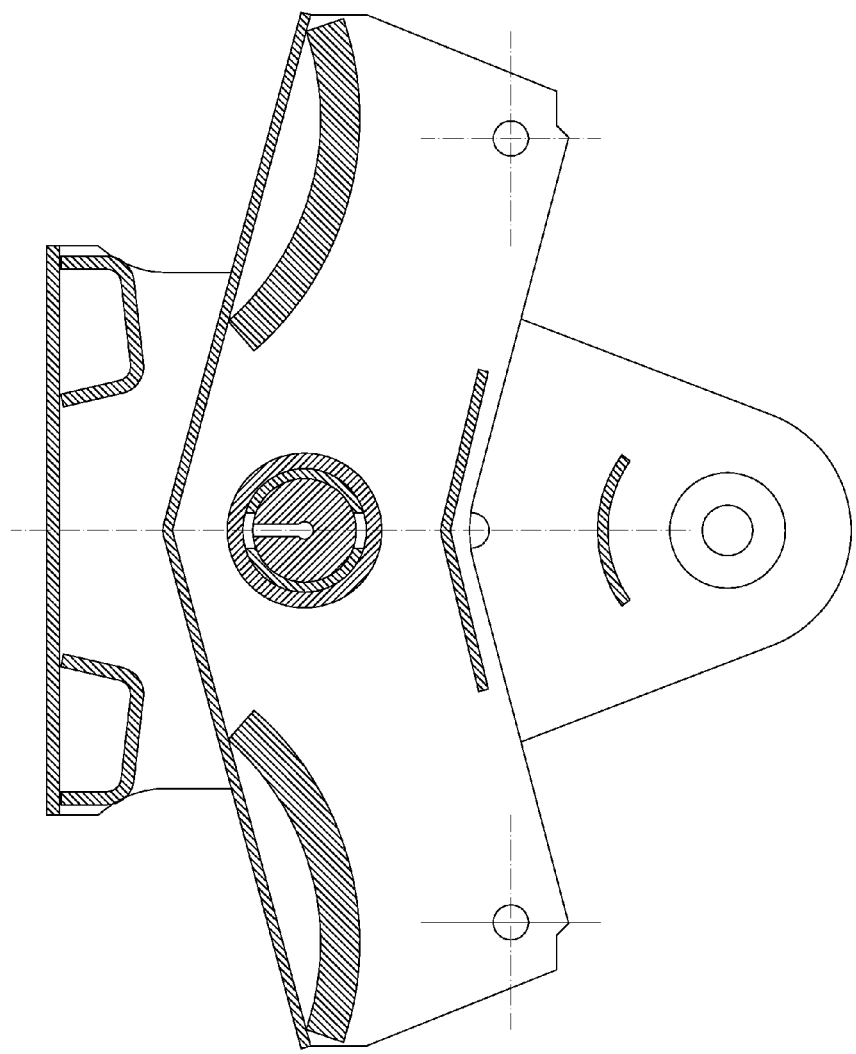
FIG. 10b—is a view of vertical section parallel to the chassis in the central hanger bracket and equalizer shown in the art of FIG. 7.
Figure 10A:
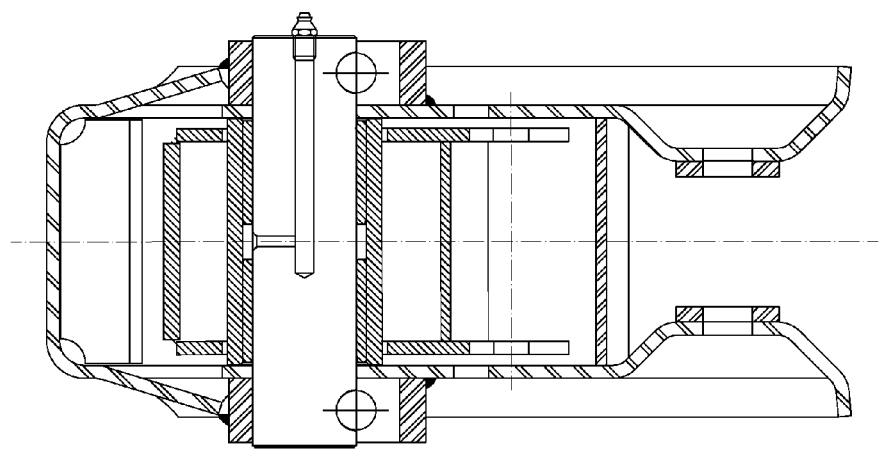
FIG. 10a—is a view of vertical section perpendicular to the chassis in the area of the central hanger bracket and equalizer shown in the art of FIG. 7.

In the embodiment that illustrates the attached figures, the CENTRAL HANGER BRACKETS AND EQUALIZERS FOR TANDEM SUSPENSION are part of mechanical suspensions with tandem axles, provided with a spring pack longitudinally arranged in each axle and parallel to the chassis of the vehicle, some of the ends of which are housed inside central hanger brackets and equalizers, respectively, comprising an equalizer (1, 11, 15), said equalizer having the area of the upper surface (7, 14, 17) in diverse shape, which leans on area (8, 13, 18) in the central hanger bracket (2, 12, 16), said central hanger bracket having also a diverse shape, thus forming a structural arrangement that provides articulation to said equalizer and eliminates the need of using pins, bushings or screws for its axial attachment with said central hanger bracket.

The equalizer (1, 11, 15) has the main function of transmitting and equalizing the load on the axles through the front and rear brackets (3, 4), central bracket (2, 12, 16) and spring pack (5, 6).

The front and rear brackets (3, 4), respectively, used in these suspensions, as well as the spring pack (5, 6), can have a diverse configuration and constructive form, in addition to those illustrated in the drawings, even with respect to constructive and functional details.

The Central hanger brackets (2, 12, 16) and the equalizers (1, 11, 15) of this invention can be designed in various manners, these manners including those obtained by the welding of several pieces, by casting, by stamping and/or by displacement of material, or by any other process and constructive form, including those by joining dismountable or overlapped parts.

In the various embodiments of the invention the central hanger brackets (2, 12, 16) are provided with areas (8, 13, 18) in the structure wherein the equalizers (1, 11, 15) are supported through the surfaces (7, 14, 17), so that said equalizers remain supported and positioned vertically due to the vertical force imposed by the brackets over said equalizers and by the contrary reaction imposed by the spring pack (5, 6), this contrary reaction coming from the vehicle's own weight and/or from the load of the vehicle.

In the areas (7-8, 13-14, 17-18) where the rotating contact between the equalizers (2, 12, 16) and the central hanger brackets (2, 12, 16) occurs, linings and/or lubricants or self-lubricating materials can be provided, as well as the use of abrasion-resistant materials of low friction resistance, so as to provide low friction interface, therefore prolonging the life of these components and reducing maintenance interventions during use.

The central hanger brackets (2, 12, 16) are also provided with a cylindrical pin (10), this cylindrical pin being transversely attached in the middle area of said hanger, and also provided with a retaining device (9) which limits the lower and longitudinal vertical displacement of the equalizers (1, 11, 15), so as to prevent it from moving whenever the axles of the vehicle float on bumps and dips present on the road, thereby forcing said components.

The pin (10) can be regularly removable to facilitate the mounting and dismounting of the equalizer (1, 11, 15) on the central hanger bracket (2, 12, 16).

The device (9) may be different from that illustrated without departing from the main scope of the invention.

In the preferred embodiment of the invention, illustrated in FIGS. 2 to 3, the area (7) of the equalizer (1) has a convex shape that rests in the area (8) of the central hanger bracket (2), this hanger bracket being also of a convex shape.

FIG. 4 illustrates the direction of movement and inclination of the equalizer until the jounce position thereof, thereby demonstrating how the retaining device works.

Other forms of achieving this invention are illustrated in FIGS. 5 to 8, in which the areas (7, 8) can be flat.

Figure 11:
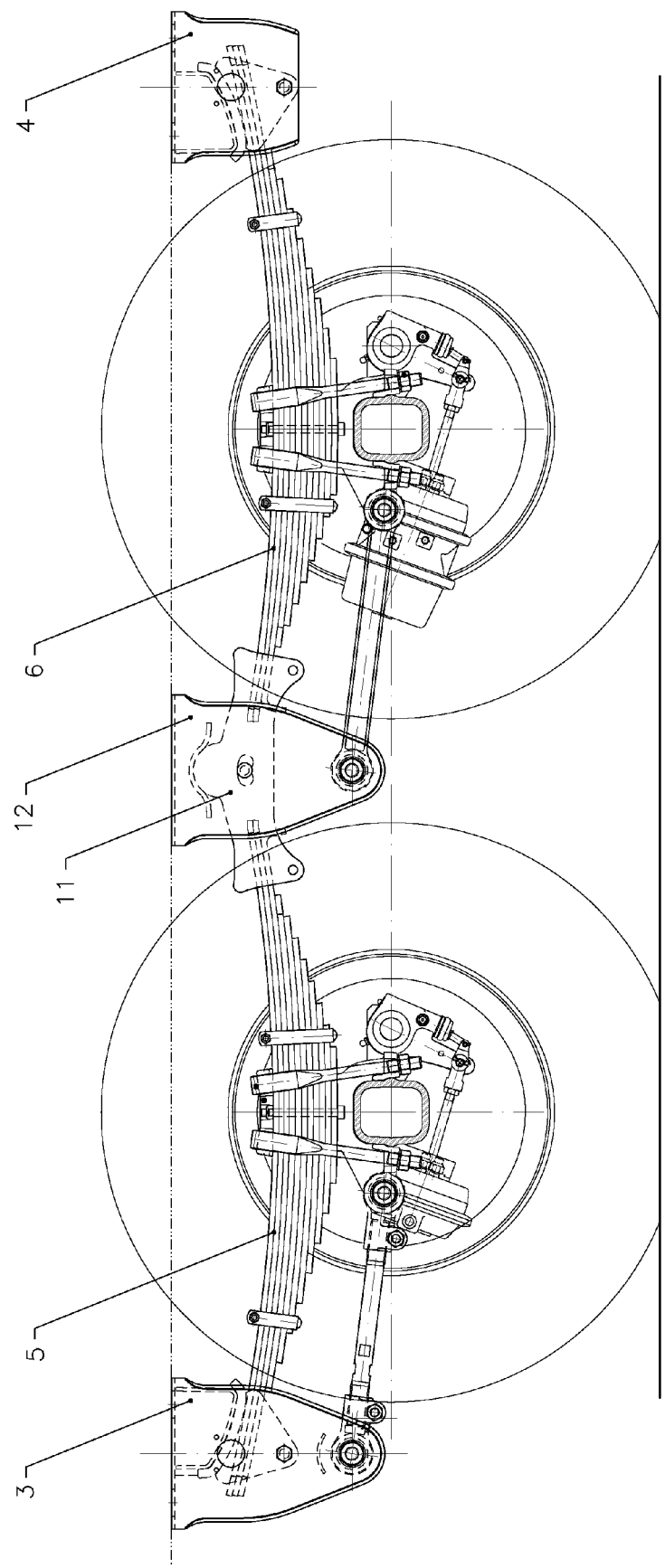
FIG. 11—is a side view of a suspension illustrating another embodiment of the central hanger bracket and equalizer for tandem suspension, which is the subject-matter of this invention.
Figure 13:
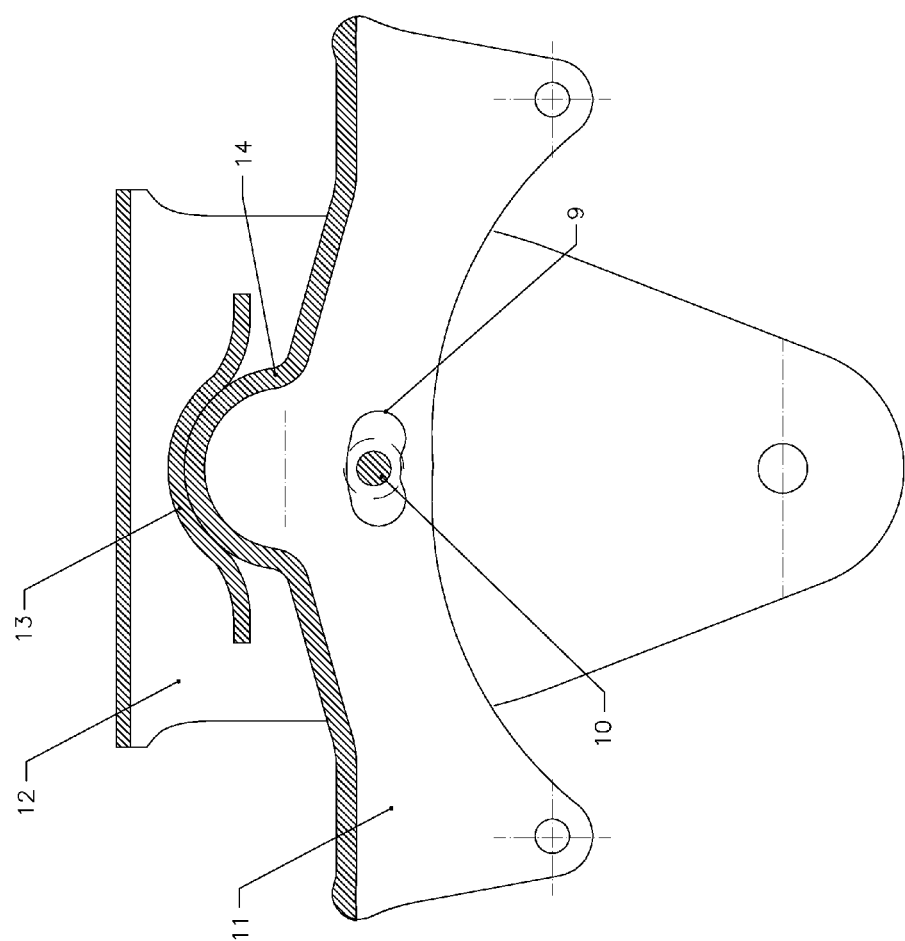
FIG. 13—is a view of vertical section parallel to the chassis in the area of the central hanger bracket and equalizer of FIG. 11, illustrating the same embodiment presented in FIG. 12.
Figure 12:
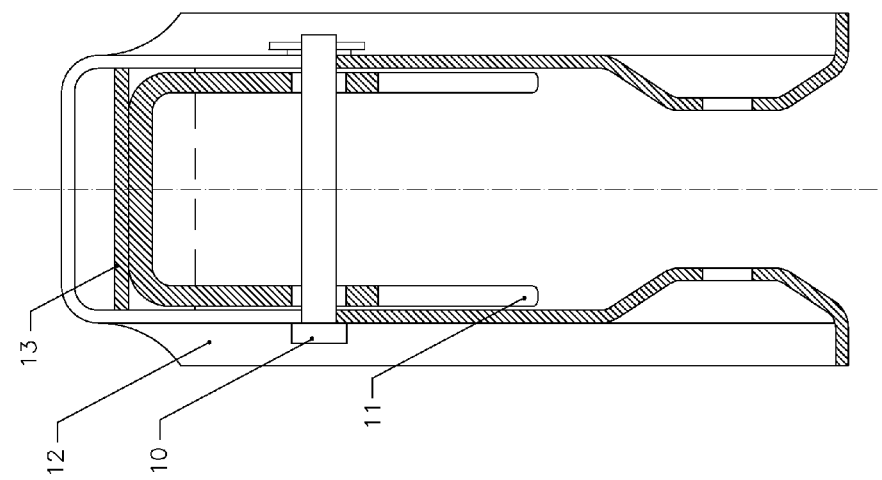
FIG. 12—is a view of vertical section perpendicular to the chassis in the area of the central hanger bracket and equalizer shown in FIG. 11.
Figure 15:
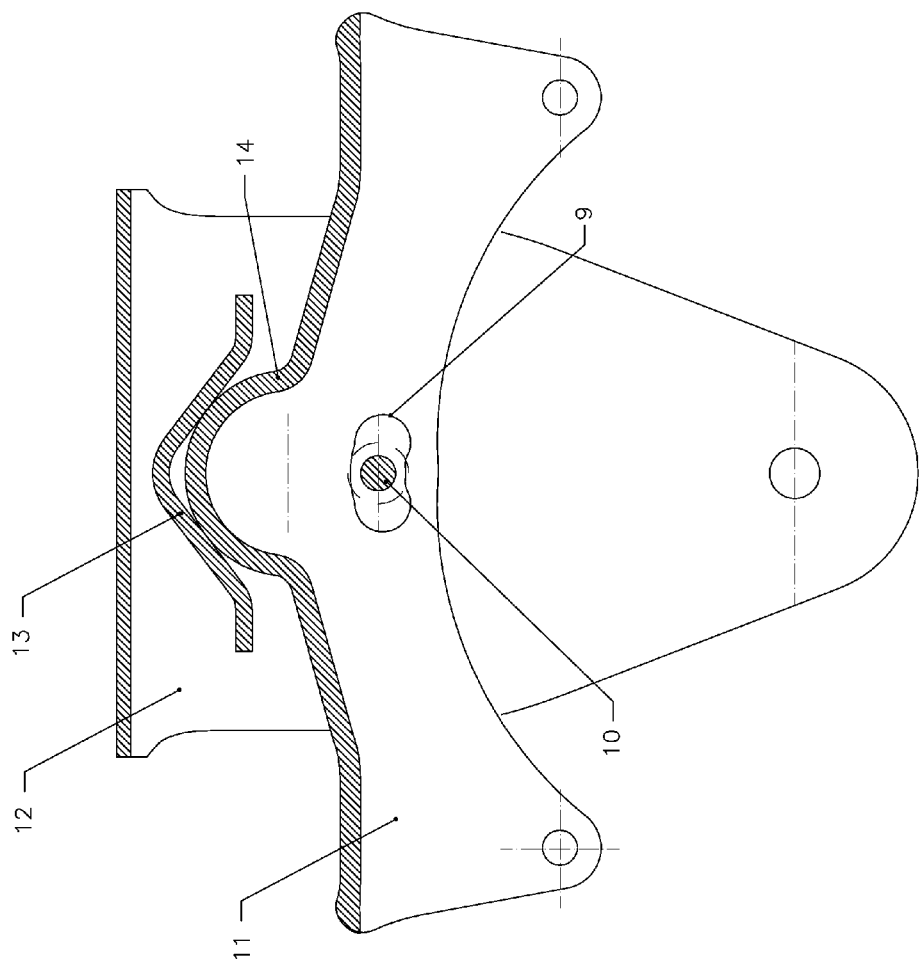
FIG. 15—is a view of vertical section parallel to the chassis in the area of the central hanger bracket and equalizer of FIG. 11, illustrating the same embodiment of the central hanger bracket and equalizer shown in FIG. 14.
Figure 14:
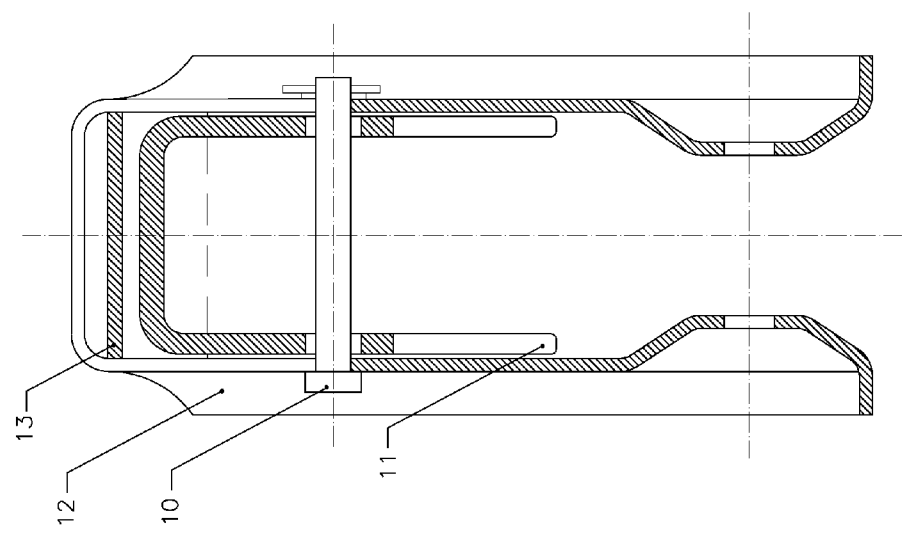
FIG. 14—View of vertical section perpendicular to the chassis in the area of the central hanger bracket and equalizer shown in FIG. 11, illustrating another embodiment of central hanger bracket and equalizer of this invention.
Figure 17:
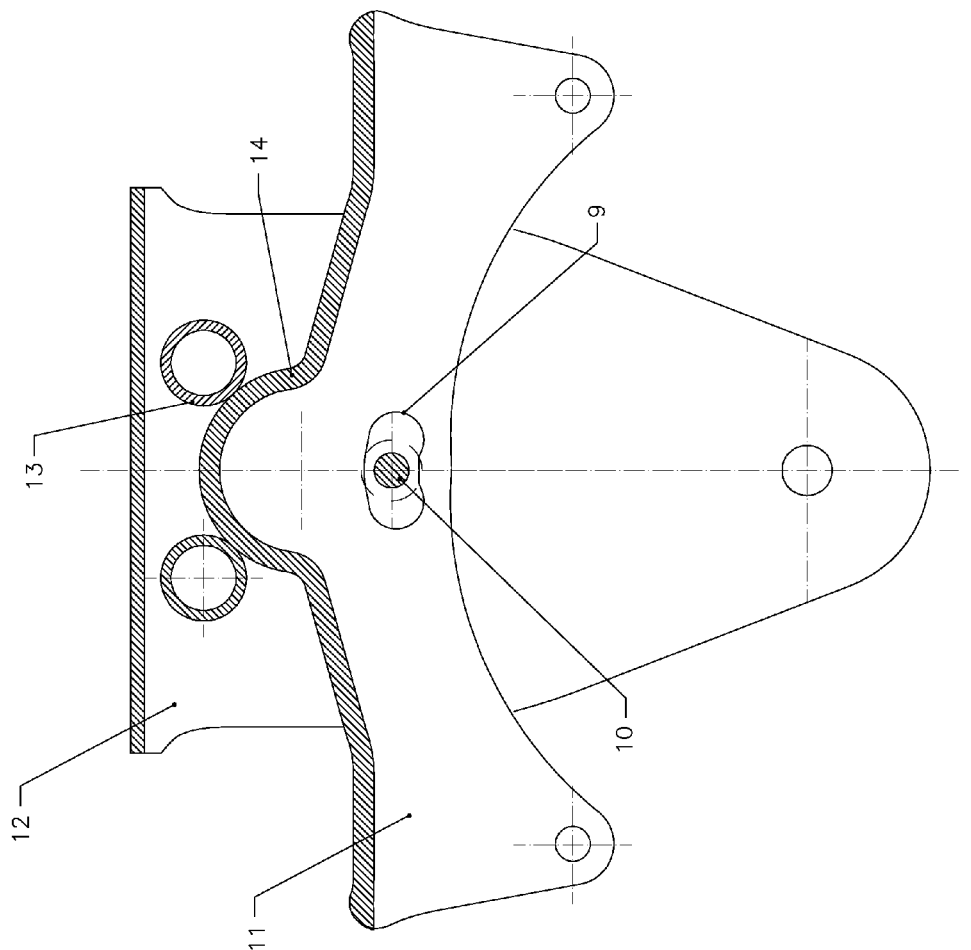
FIG. 17—is a view of vertical section parallel to the chassis in the area of the central hanger bracket and equalizer of FIG. 11, illustrating the same embodiment of the central hanger bracket and equalizer shown in FIG. 16.
Figure 16:
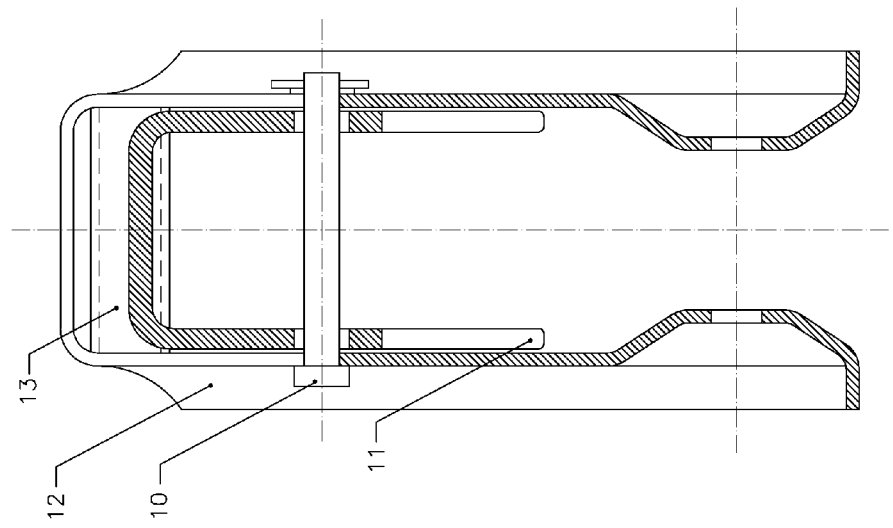
FIG. 16—is a view of vertical section perpendicular to the chassis in the area of the central hanger bracket and equalizer of FIG. 11, illustrating another embodiment of the central hanger bracket and equalizer of this invention.

In FIGS. 11 to 13, another embodiment of how to achieve this invention is illustrated, where the equalizer's (11) upper part of the body has a protruding area (14) of a convex shape, which supports and couples to a concave recess (13) arranged on the central hanger bracket (12), allowing the articulation and inclination of said equalizer relative to said bracket.

Other forms of achieving this invention in relation to FIG. 11 are illustrated in FIGS. 14 to 17, in which the areas (13, 14) can be devised by surfaces formed by a succession of matching radii and/or inclined planes, or through the distribution of cylinders or semi-cylinders.

Figure 18:
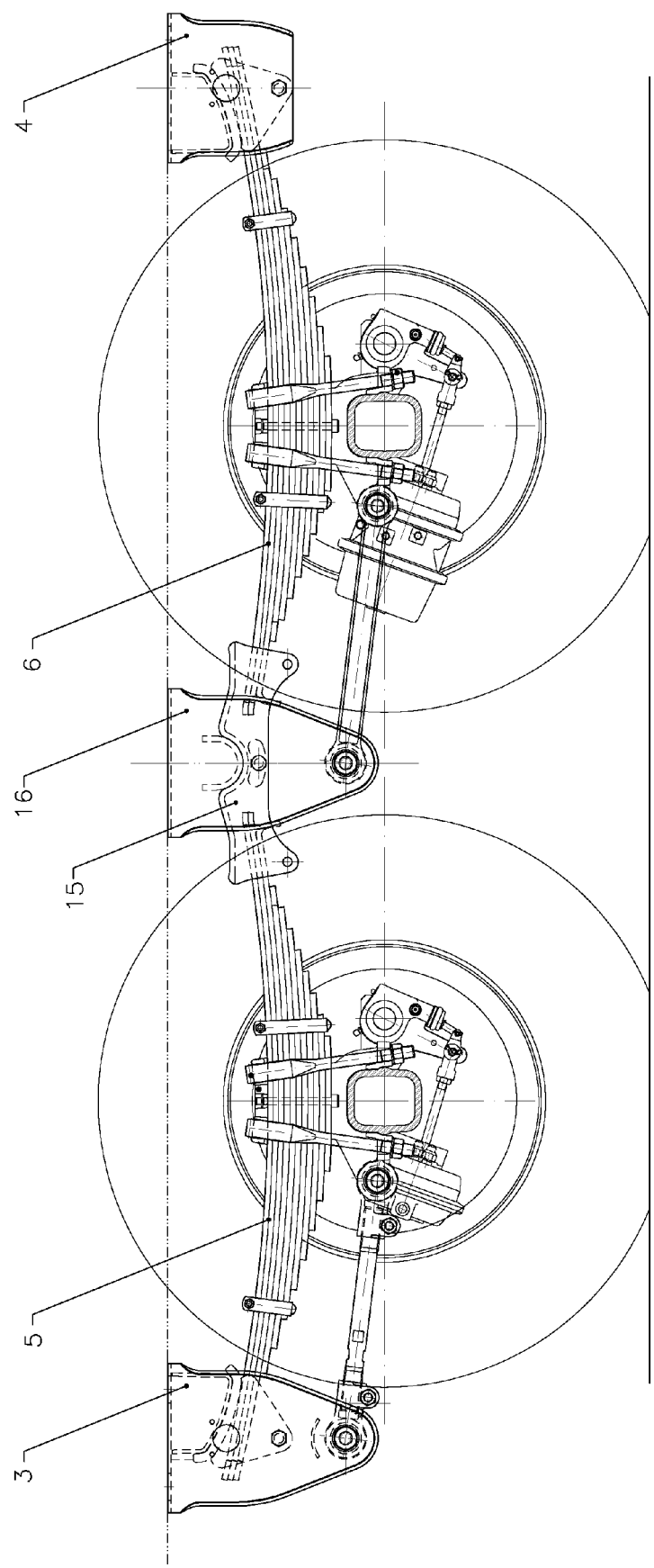
FIG. 18—is a side view of a suspension illustrating another embodiment of the central hanger bracket and equalizer for tandem suspension, which is the subject-matter of this invention.
Figure 20:
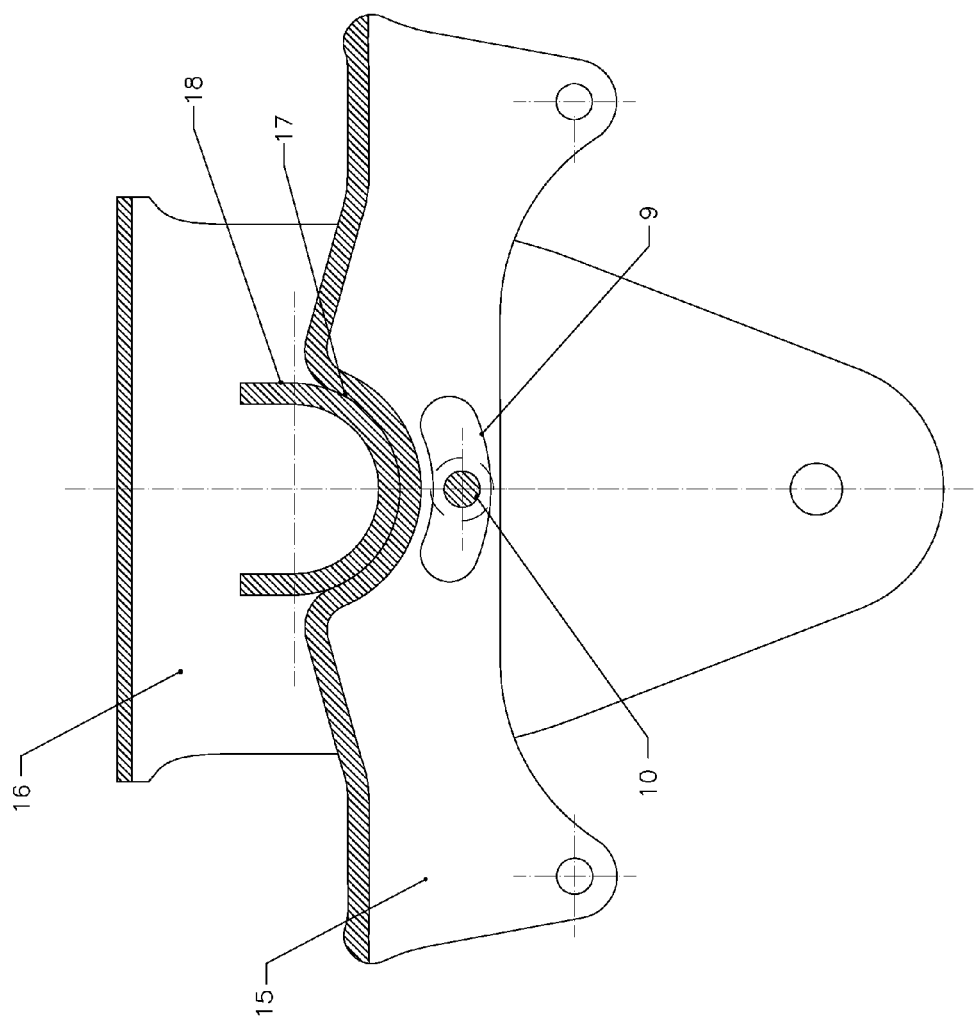
FIG. 20—is a view of vertical section parallel to the chassis in the area of the central hanger bracket and equalizer of FIG. 18.
Figure 19:
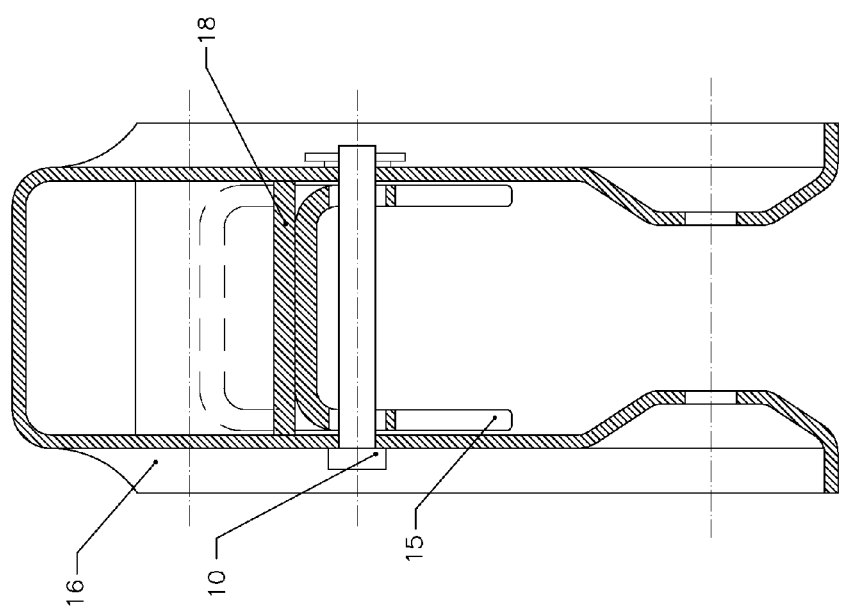
FIG. 19—is a view of vertical section perpendicular to the chassis in the area of the central hanger bracket and equalizer of FIG. 18.
Figure 22:
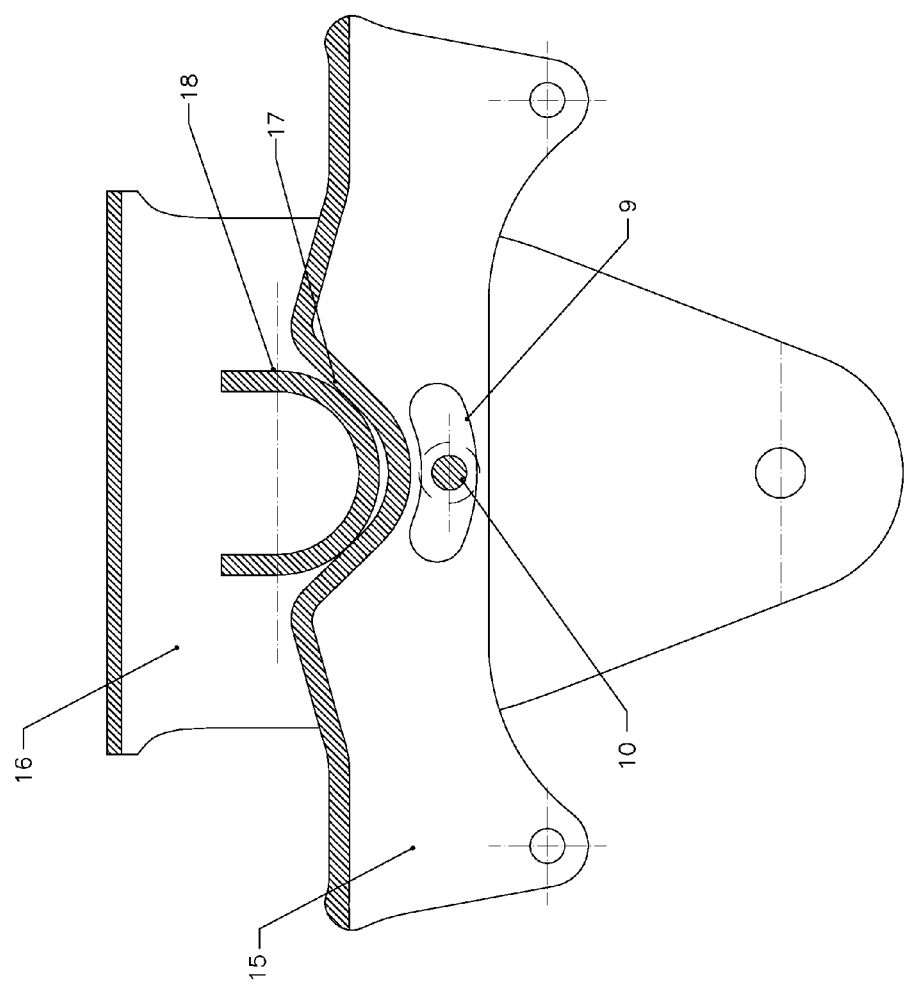
FIG. 22—is a view of vertical section parallel to the chassis in the area of the hanger bracket and equalizer of FIG. 18, illustrating the same embodiment of hanger bracket and equalizer shown in FIG. 21.
Figure 21:
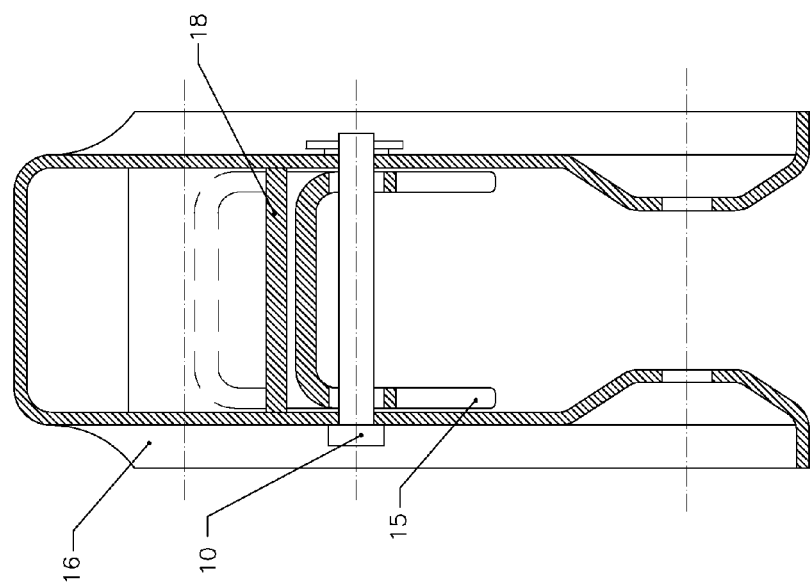
FIG. 21—is a view of the vertical section perpendicular to the chassis in the area of the central hanger bracket and equalizer of FIG. 18, illustrating another embodiment of the hanger bracket and equalizer of this invention.
Figure 24:
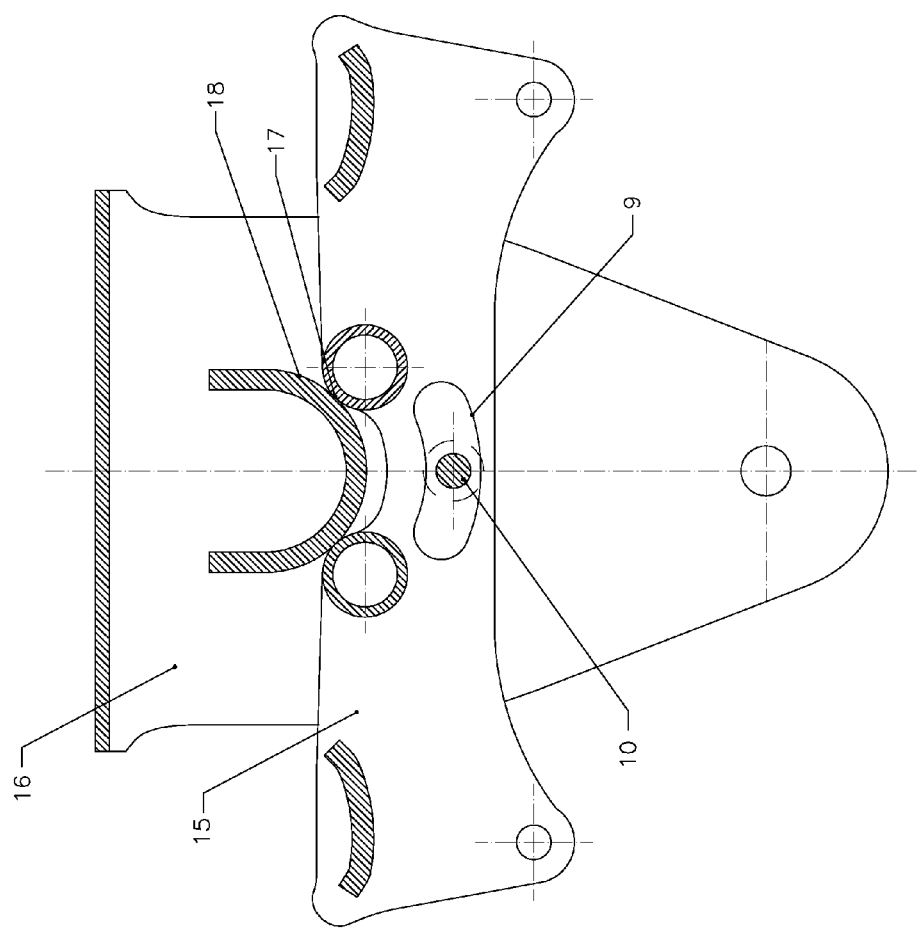
FIG. 24—is a view of vertical section parallel to the chassis in the area of the central hanger bracket and equalizer of FIG. 18 rocker, illustrating the same embodiment of the central hanger bracket and equalizer shown in FIG. 23.
Figure 23:
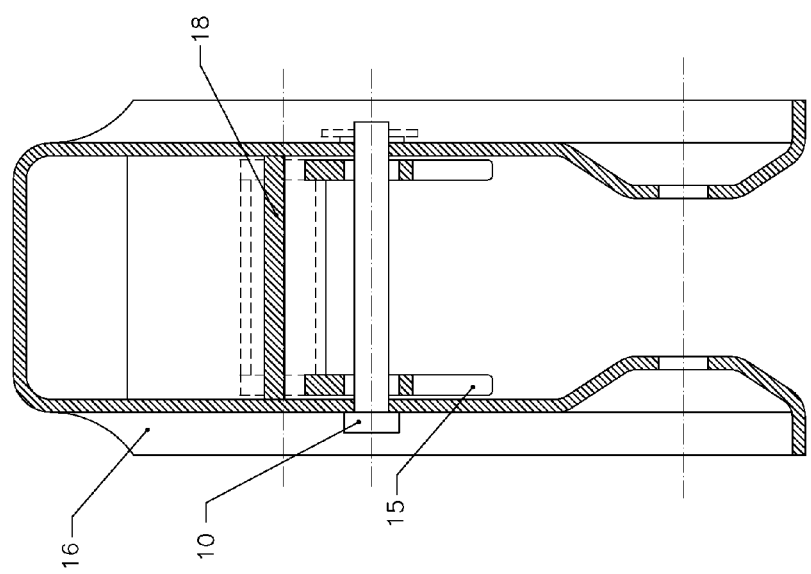
FIG. 23—is a view of vertical section perpendicular to the chassis in the area of the central hanger bracket and equalizer of FIG. 18, illustrating another embodiment of central hanger bracket and equalizer of this invention.
Figure 26:
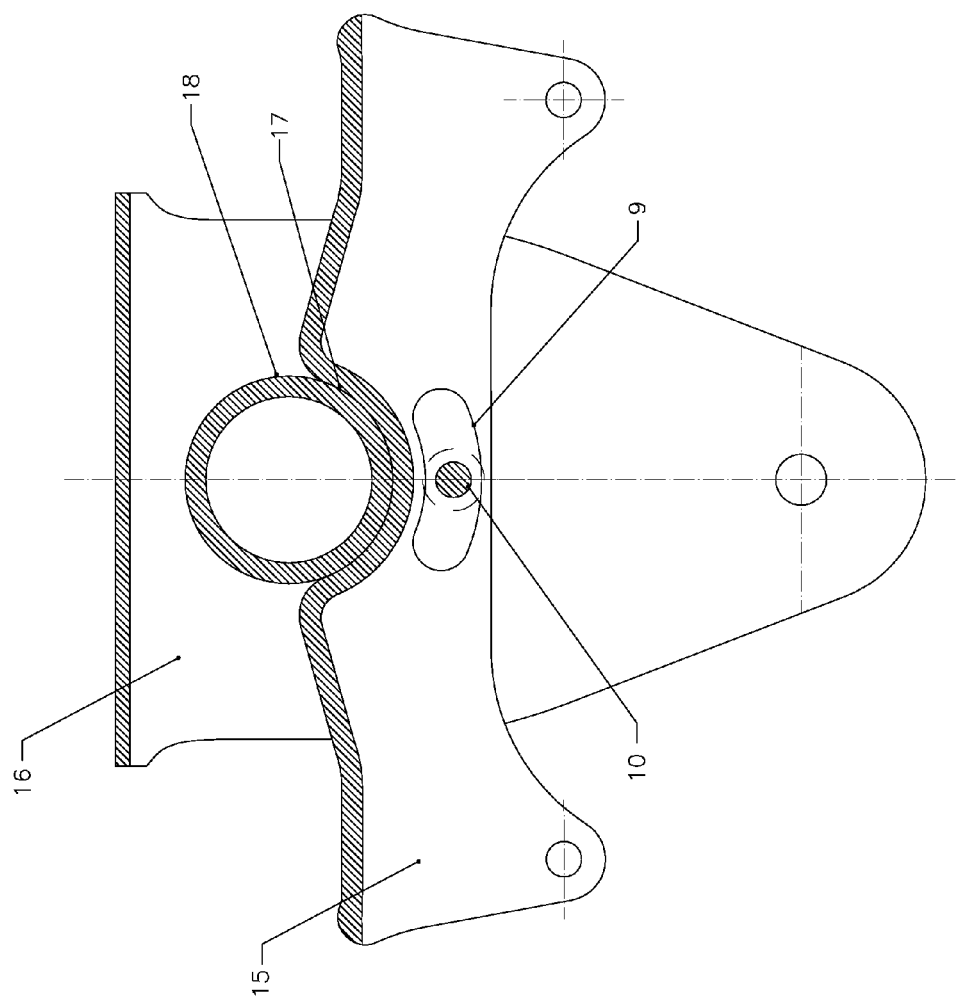
FIG. 26—is a view of vertical section parallel to the chassis in the area of the central hanger bracket and equalizer of FIG. 18, illustrating the same embodiment of the central hanger bracket and equalizer shown in FIG. 25.
Figure 25:
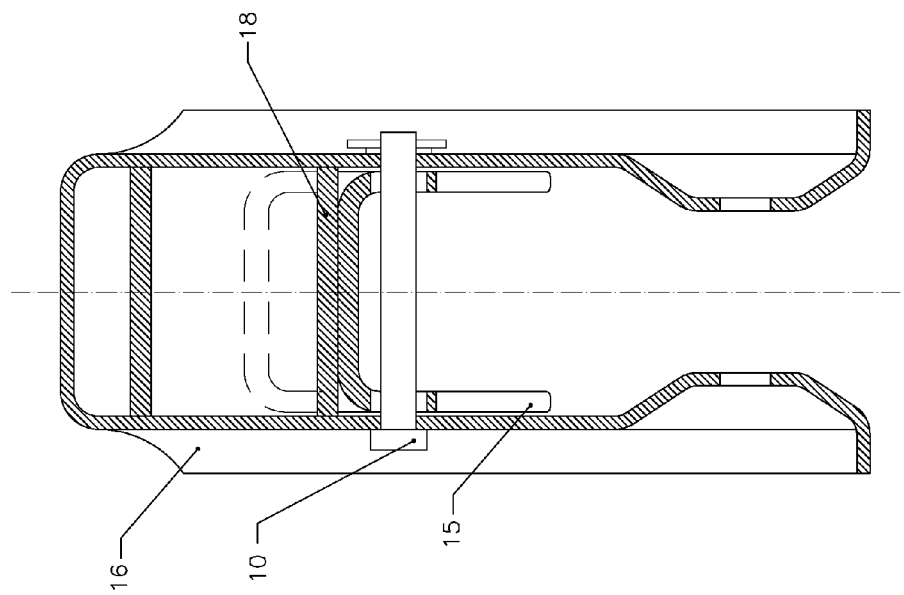
FIG. 25—is a view of vertical section perpendicular to the chassis in the area of the central hanger bracket and equalizer of FIG. 18, illustrating another embodiment of central hanger bracket and equalizer of this invention.
Figure 28:
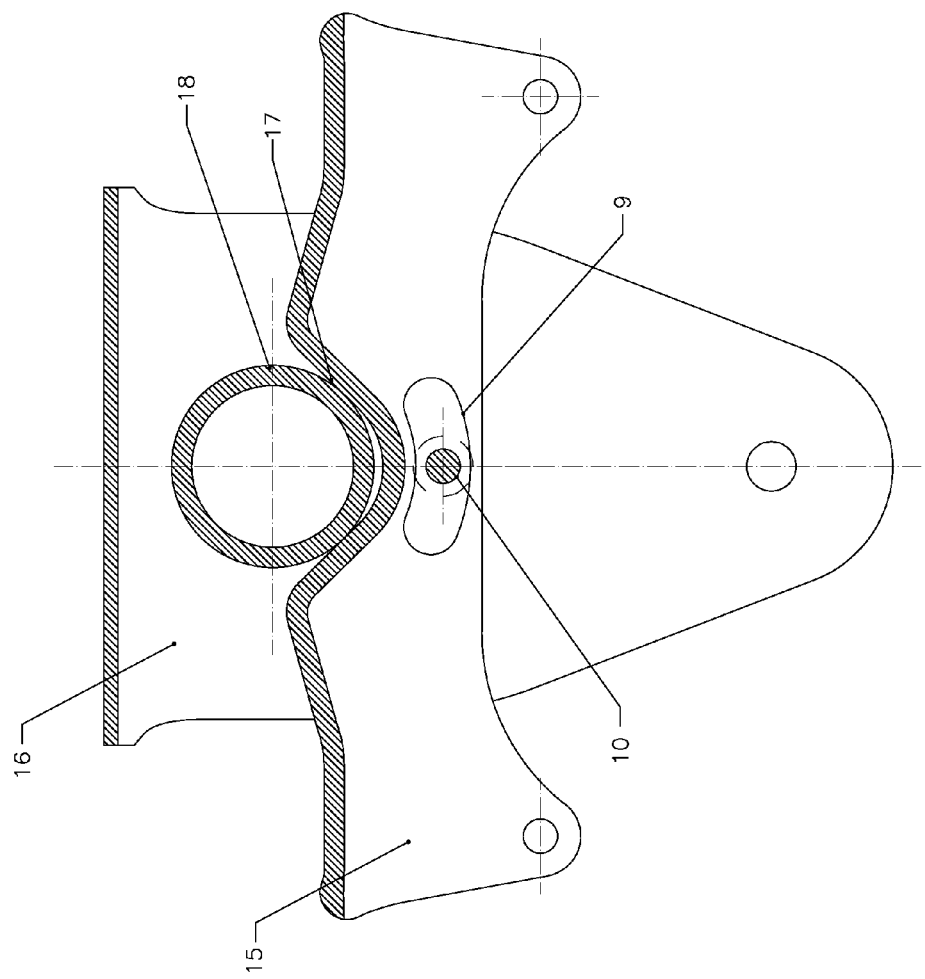
FIG. 28—is a view of vertical section parallel to the chassis in the area of the central hanger bracket and equalizer of FIG. 18, illustrating the same embodiment of the hanger bracket and equalizer shown in FIG. 27.
Figure 27:
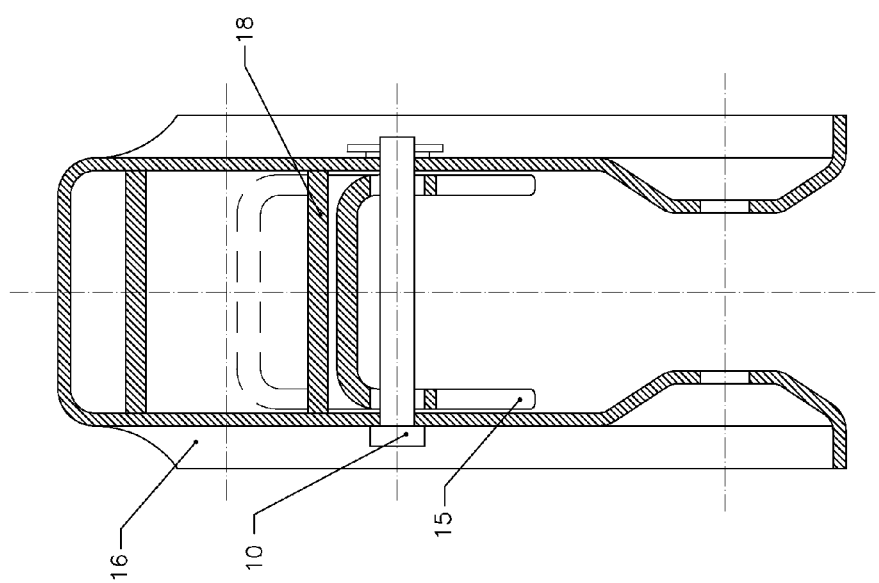
FIG. 27—is a view of vertical section perpendicular to the chassis in the area of the central hanger bracket and equalizer of FIG. 18, illustrating another embodiment of the central hanger bracket and equalizer of this invention.

In FIGS. 18 to 20, another embodiment of how to achieve this invention is illustrated, where the equalizer (15) has a cavity (17) at the upper part of the convex-shaped body, which supports and couples to a convex protrusion (18) arranged on the central hanger bracket (16), allowing the articulation and inclination of said equalizer relative to said central hanger bracket.

Other forms of achieving this invention, in relation to FIG. 18, are illustrated in FIGS. 21 to 30, in which the areas (17, 18) can be devised by surfaces formed by a succession of matching radii and/or through the combination of inclined planes, or through the distribution of cylinders or semi-cylinders.

The equalizers (1, 11, 15) and the central hanger brackets (2, 12, 16) may also have areas with limiting devices and elements on the interface of lateral contact, the function of which is to retain the lateral displacement of the equalizer due to the lateral efforts of the vehicle, and to serve as wear area.

As illustrated and described, and in addition to such illustration and description, generally stated, other embodiments and applications of this invention may be revealed and finished in several constructive forms, so as to achieve the scope of this invention such that it may function within the established object, since, practically speaking, said invention provides a significant reduction in costs related to manufacturing and maintenance, transport logistics and assembly, due to a fewer number and type of components, ease of assembly and less wear during use. This means that the description, the embodiments mentioned and illustrated in the figures are intended for illustrative purposes only and are not intended to limit the scope of this invention.

Through these central hanger brackets and equalizers for tandem suspension, in this invention, some costly and wear items have been eliminated, making the set simpler, more durable and cheaper in cost, for application in trucks, trailers and semi-trailers.

It will be easily understood by those skilled in the art that this invention may be modified without departing from the principles exposed in the previous description. These modifications should be considered to be included within the scope of the invention. As a result, the particular achievements described above, in detail, are only illustrative and non-restrictive as to the scope of the invention, to which it should be given the full extent of the enclosed claims set out and any and all equivalents thereof.

The invention claimed is:

1. Central Hanger bracket and equalizer for tandem suspension, used in trucks, trailers and semi-trailers, comprising:
    an equalizer comprising a body having an upper part and side walls, the upper part provided with an area in a convex or flat shape, the equalizer further comprising a retaining device located in a middle area of the side walls; and
    a hanger bracket provided with a flat or convex area, arranged on an upper middle portion of the hanger bracket, the hanger bracket further comprising a cylindrical pin fixed transversely in a middle area of the hanger bracket; wherein
    the upper part of the equalizer body and the flat or convex areas of the hanger bracket support each other to allow articulation and/or vertical inclination of the equalizer relative the central bracket for distribution of load between axles; and
    said cylindrical pin fixed transversely in the middle area of the hanger bracket, when in contact with the retaining device located in the middle area of the side walls of the equalizer, limits lower vertical displacement and longitudinal displacement of the equalizer relative to the central hanger bracket.

2. Central hanger bracket and equalizer for tandem suspension, according to claim 1, wherein the upper part of the equalizer body is provided with an area with a convex shape and the hanger bracket is provided with a convex area, and the convex area of the equalizer and the convex area of the hanger bracket is formed by a succession of different matching radii and/or by a combination of inclined planes.

3. Central hanger bracket and equalizer for tandem suspension, used in trucks, trailers and semi-trailers, comprising:
    an equalizer comprising a body having an upper part and side walls, the upper part provided with a protruding and convex-shaped area, the equalizer further comprising a retaining device located in a middle portion of the side walls; and
    a central hanger bracket provided with a concave cavity arranged in an upper middle portion of the central hanger bracket, the central hanger bracket further comprising a cylindrical pin fixed transversely in a middle portion of central hanger bracket; wherein
    the protruding and convex-shaped area of the equalizer body and the concave cavity of the central hanger bracket support each other to allow articulation and/or vertical inclination of the equalizer relative to the central hanger bracket for distribution of load between axles; and
    said cylindrical pin fixed transversely in the middle portion of central hanger bracket, when in contact with the retaining device located in the middle portion of side walls of the equalizer, limits lower vertical displacement of the equalizer relative to the central hanger bracket.

4. Central hanger bracket and equalizer for tandem suspension, according to claim 3, wherein the protruding and convex-shaped area of the equalizer body is formed by a succession of different matching radii and/or by a combination of inclined planes.

5. Central hanger bracket and equalizer for tandem suspension, according to claim 3, wherein the concave cavity arranged in the upper middle portion of the central hanger bracket is formed by a succession of matching radii and/or by the combination of inclined planes or cylinders distributed in contact areas.

6. Central hanger bracket and equalizer for tandem suspension, used in trucks, trailers and semi-trailers, comprising:
    an equalizer comprising a body having an upper part and side walls, the upper part provided with an area in a concave cavity, the equalizer further comprising a retaining device located in a middle portion of the side walls; and
    a central hanger bracket provided with a convex-protruding area arranged in an upper middle portion of the central hanger bracket, with the central hanger bracket further comprising a cylindrical pin fixed transversely in a middle portion of the central hanger bracket; wherein
    the area in the concave cavity of said equalizer and the convex-protruding area of the central hanger bracket support each other to allow articulation and/or vertical inclination of the equalizer, in relation to the central hanger bracket for distribution of load between axles; and
    said cylindrical pin fixed transversely in the middle portion of central hanger bracket, when in contact with the retaining device located in the middle portion of side walls of the equalizer, limits lower vertical displacement of the equalizer in relation to the central hanger bracket.

7. Central hanger bracket and equalizer for tandem suspension, according to claim 6, wherein the upper part of the equalizer body provided with a concave cavity is formed by a succession of matching radii and/or by the combination of inclined planes or cylinders distributed in contact areas.

8. Central hanger bracket and equalizer for tandem suspension, according to claim 6, wherein the convex-protruding area arranged in the upper middle portion of central hanger bracket is formed by a succession of matching radii and/or by a cylinder or semi-cylinder distributed in contact areas.

* * * * *